Nov. 7, 1939.    S. B. APPLEBAUM    2,179,246
WATER TREATING APPARATUS
Filed Sept. 14, 1937    2 Sheets-Sheet 1
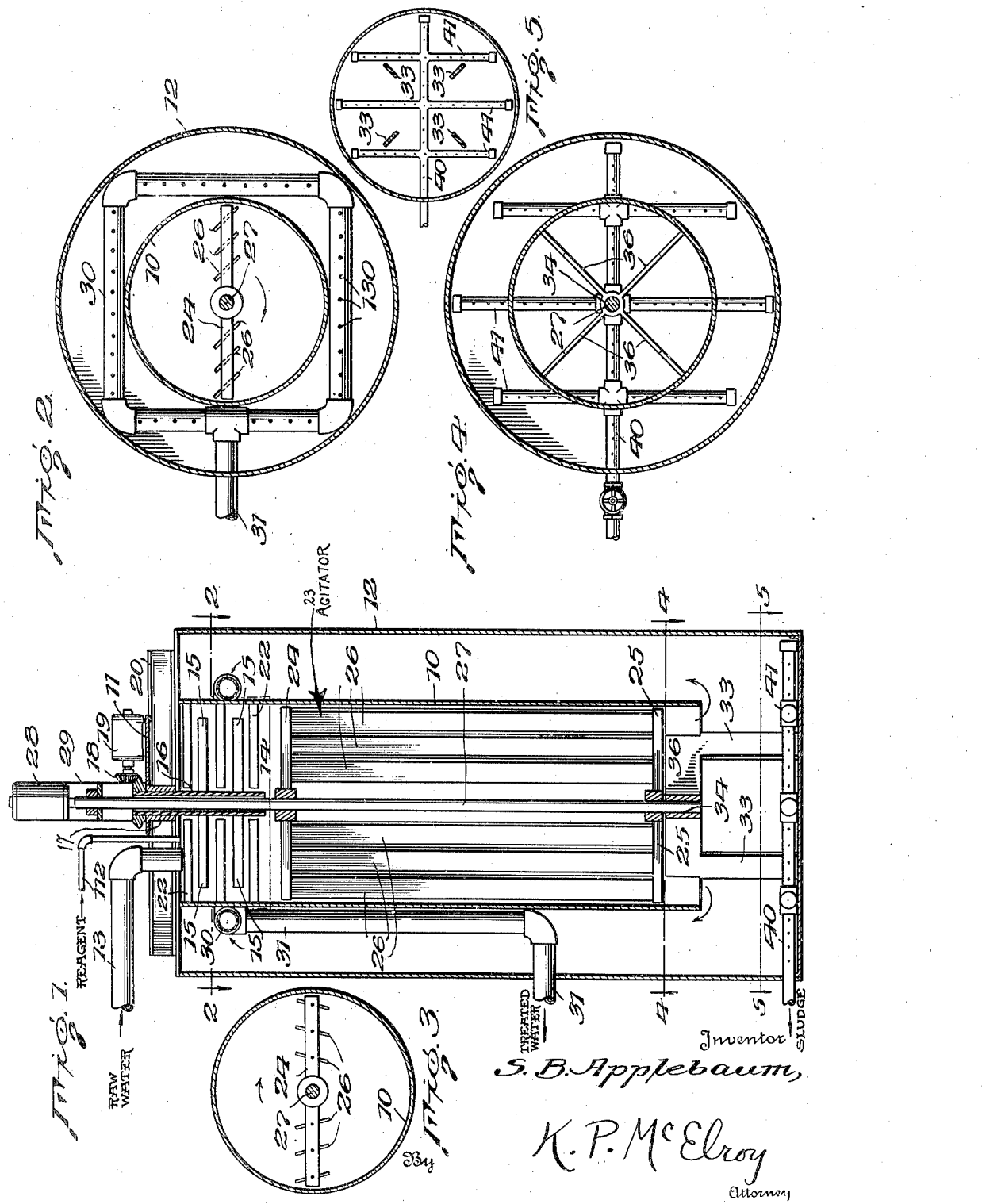

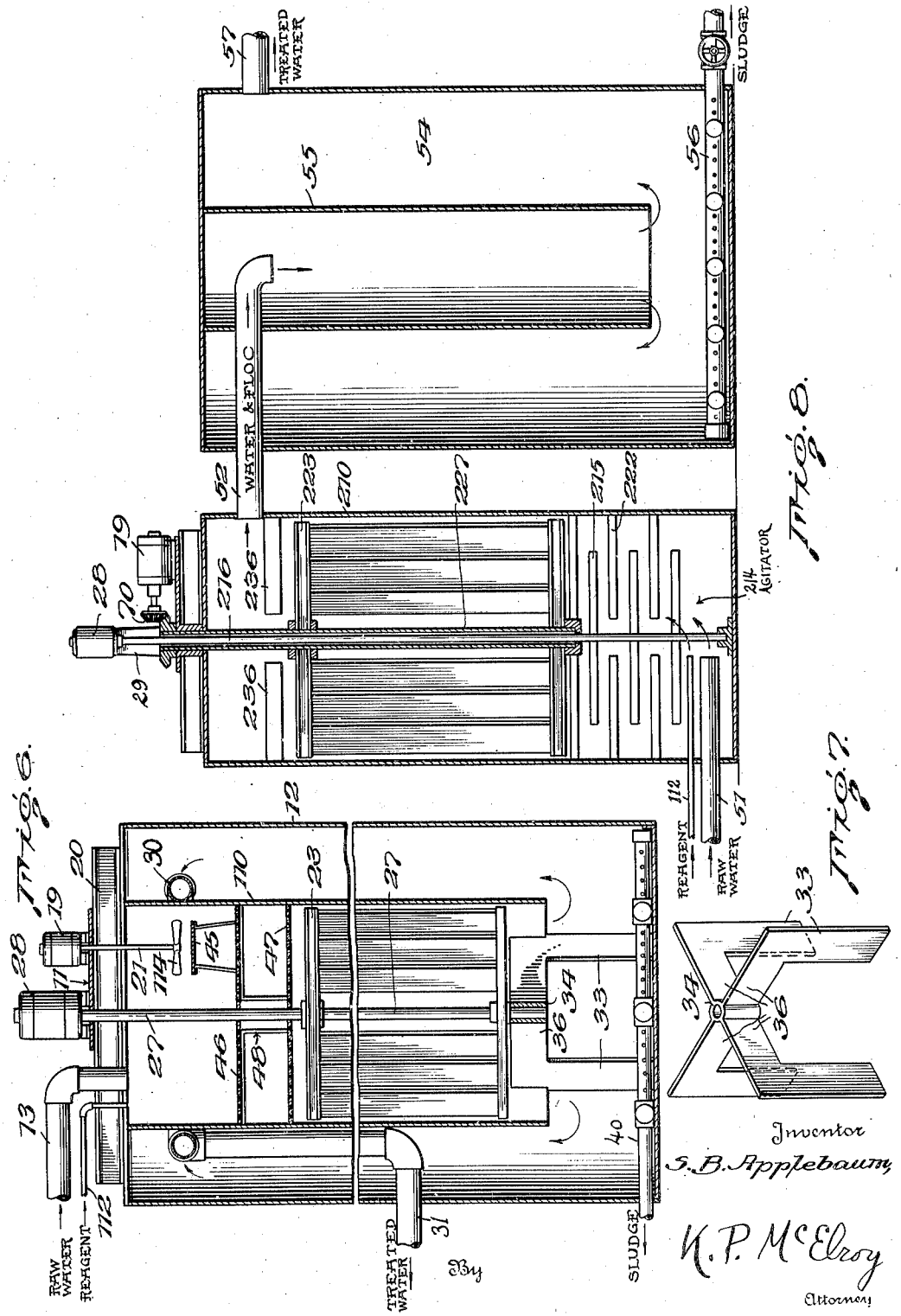

Patented Nov. 7, 1939

2,179,246

UNITED STATES PATENT OFFICE 2,179,246

WATER TREATING APPARATUS

Samuel B. Applebaum, New York, N. Y., assignor to The Permutit Company, New York, N. Y., a corporation of Delaware Application September 14, 1937, Serial No. 163,843

8 Claims. (Cl. 210—16)

This invention or discovery relates to water treating apparatus; and it comprises an upright hollow cylinder adapted to carry a flow of water and having inlet and outlet means at opposite ends thereof, means for introducing a floc-forming or precipitate-forming reagent near the inlet, a high speed agitator rotating in a horizontal plane adjacent the inlet end of the cylinder to impart a turbulent swirl to the flow of water and reagent, a relatively slowly rotating agitator in the cylinder arranged to impart to the liquid a slow agitation subsequent to the high speed mixing, substantially vertical rotating shafts extending above the top of the cylinder and arranged for driving the two agitators, and means for rotating the shafts, horizontal vane members usually being provided adjacent the outlet end of the cylinder for arresting the rotary motion of the liquid; all as more fully hereinafter set forth and as claimed.

The amount of any impurity in ordinary water is usually extremely small on a percentage basis. It is usually reckoned in parts per million or milligrams per liter. In purification, soluble impurities are rendered insoluble by adding a reagent, and after the reaction the treated water is turbid. The amount of chemical required in purifying water is also small, and in all cases there is the problem of distributing a rather small minor volume of chemicals throughout a large major amount of water with evenness and uniformity. Many chemicals are used in treating water. For softening water by removing lime and magnesia it is common practice to use a soda lime treatment. With muddy or turbid waters containing suspended mechanical impurities, it is common to use a coagulant which may be alum, ferric salts, etc. Whatever the way of purifying water adopted, the result is a small amount of solid matter evenly distributed through a large volume of water. Due to the slowness of the reactions at cold temperatures, the precipitates formed constitute a turbid suspension of particles of colloid fineness which are slow in settling. Precipitation and settling is accelerated by controlled agitation. There is no particular difficulty in securing an even admixture of a small volume of chemical with a large volume of water, but there is often difficulty and delay in subsequently forming, collecting and removing the fine solids. Settling is slow and large apparatus is required. For example in the ordinary soda lime treatment of water in the cold there is a fine first precipitate not altogether easy to settle and separate and an after-separation of solids which are still more difficult of removal. It is common practice to store the treated water in settling tanks for a half day or more, and also to filter the stored water.

Various mechanical means have been devised to hasten formation and separation of the solid matter giving turbidity to purified water. Such means have involved mechanical difficulties complicated by driving machinery under water.

In the present invention I provide a simple and compact apparatus for treating water with reagents producing a precipitate or a floc, in which a reagent is mixed with the water and admixture completed under conditions of violent swirling agitation. The mixture is then subjected to a relatively slow and gentle agitation of such character as to expedite formation of readily-settling particles. The second agitation is carried out under regulated conditions so as to be neither too violent nor too mild; there being an optimum degree of agitation for maximum effect in settling the floc. The object is to stir out the solids instead of stirring them in. My apparatus is so arranged that these rather complex agitations are produced by mechanism the vital parts of which are protected from the water, and the zones of agitation are connected to each other in a way ensuring maximum efficiency.

In the accompanying drawings are shown more or less diagrammatically, various modifications of treating and flocculating apparatus within the purview of my invention. In this showing Fig. 1 is a view in vertical section of a downward flow flocculating unit within a settling tank;

Fig. 2 is a horizontal section along the line 2—2 of Fig. 1;

Fig. 3 shows a modification of the agitator of Fig. 2;

Fig. 4 is a horizontal section along the line 4—4 of Fig. 1;

Fig. 5 is a horizontal section along the line 5—5 of Fig. 1;

Fig. 6 is a modified downward flow flocculating unit shown in vertical section within a settling tank;

Fig. 7 is a view in perspective of the spider of Figs. 1 and 6; and

Fig. 8 is a showing in vertical section of an upward flow flocculating unit delivering into a separate settling tank.

Referring to the drawings, a flocculating unit may be disposed in a settling tank, as shown in Figs. 1 and 6; or it may be connected to a settling tank as shown in Fig. 8. The flocculating unit of Fig. 1, comprises a cylindrical tank-like member 10 having an open top and arranged inside a tank 12. An inlet pipe 13 delivers to cylinder 10 the fluid to be treated and a pipe 112 delivers a desired reagent solution. In the upper portion of the member 10 adjacent the inlet is a high speed agitator 14 having horizontal blades 15 and a vertical hollow shaft 16 passing through a collar 17 suitably mounted on a plate 11 which is supported by two beams 20 at the top of the apparatus. Gearing 18 connects the shaft to a motor 19 supported on plate 11. Between the blades 15, stationary horizontal baffles 22 are attached to the cylindrical wall of the member 10. These baffles serve when blades 15 are rotated to create a swirling movement in the liquid passing downwardly through the member 10.

Below the agitator-baffle system 14, 22, is a second agitator 23 comprising, as shown, top and bottom cross members 24 and 25 rigidly connected to a drive shaft 27 and vertically arranged blades 26 attached to the top and bottom members, and inclined with respect thereto as shown in Fig. 2. This driving shaft passes through the hollow shaft 16 of agitator 14 and is driven by motor 28 with integral gear reduction which is mounted upon a supporting structure 29, this being in turn mounted on the supporting beams 20. The inclined blades 26, rotating as indicated by the arrow in Fig. 2, move the fluid being agitated toward the center and thus eliminate a more or less stagnant core of fluid near the shaft 27 which would be agitated less than the fluid nearer the periphery. In a modified agitator shown in Fig. 3 the blades on one side of the axis are inclined in the opposite direction to the blades on the other side. Upon rotation in the direction of the arrow one set of blades moves the liquid toward the center whereas the other set moves the liquid away from the center, thus setting up a rotating horizontal current passing through the center. The agitator per se having oppositely inclined blades, as illustrated in Fig. 3, is not my invention and is specifically claimed in a co-pending application of Eric Pick, Ser. No. 264,922, filed March 30, 1939.

As shown, an outlet distributor 30 is arranged in the tank 12 surrounding flocculating unit 10. This outlet distributor has perforations 130 for collecting liquid, and delivers to a pipe 31 passing out through the wall of tank 12. As shown, the outlet distributor and collector 30 is arranged on the overflow principle, so that the level of liquid in the apparatus is kept at a desired height.

The flocculating unit is supported upon the bottom of the settling tank by a spider 33 carrying a guide bearing 34 in which shaft 27 rotates. This spider has stationary vanes 36 so that liquid flowing past the agitator 23 and having a horizontal rotatory movement contacts vanes 36 and the rotatory movement is arrested. The flow is straightened, in order to avoid interference with the settling in tank 12 outside the flocculating unit due to turbulence.

In operation, the agitator 14 is rotated at relatively high speed and the agitator 23 at relatively low speed. An advantageous rotational speed is a peripheral velocity of about 300 feet per minute for the high speed mixing agitator and a peripheral speed of about 50 to 150 feet per minute for the slow motion agitator. Liquid and chemical entering the flocculating unit through inlets 13 and 112 are given a violent horizontal swirl for a period of from two to seven minutes by agitator 14 whereby they are thoroughly mixed. This is succeeded by a slower rotation for a period of from twenty minutes to one hour by agitator 23 whereby precipitates of relatively large particle size are caused to form. The slow rotation is, by reason of the length of the vertical blades 26, greater in duration than the high speed turbulent rotation. Liquid leaves the flocculating unit at the bottom, and flocs formed in the unit settle as a sludge in the bottom of the settling tank 12, and may be drawn off through an outlet pipe system shown as central pipe 40 and transverse perforated pipes 41. Clarified liquid is withdrawn from the top of the settling tank through pipe 31.

In Fig. 6 is shown a modified form of downflow flocculating unit in which the high speed agitator is a vane propeller 114, directly driven at a speed of about 500 to 2000 R. P. M. by a motor 19 mounted upon plate 11 on top of the cylinder 110, with an operating shaft 21 entirely independent of shaft 27 of the low speed agitator 23. A horizontal baffle 45 is arranged in proximity to the propeller 114, the baffle being supported upon a perforated plate 46. A second perforated plate 47 is arranged below the plate 46, and stationary vanes 48 between the perforated plates reduce the turbulent horizontal swirl in the liquid imparted by the propeller 114, working against the baffle 45. With this arrangement the violent currents produced by propeller 114 are kept from reaching the region of the slow motion agitator. The well mixed homogenized liquid passes through the perforated plates to the slow motion horizontal agitator having inclined blades as shown in Figs. 2 or 3 and thence through the bottom of the flocculating unit into the settling tank where the flocs settle out.

In Fig. 7 is shown the construction of the spider 33 with vanes 36 and guide bearing 34 for the low speed agitator shaft.

In Fig. 8 the flocculating unit 210 is provided with bottom inlets 51 for liquid and 112 for reagent solution, and top outlet 52 delivering into a settling tank 54. The high speed turbulent agitator 214 is near the bottom of the unit, and is provided with horizontal blades 215 and horizontal baffles 222. The low speed agitator 223 is similar to that shown in Fig. 1. In this case shaft 216 of the high speed agitator passes through the hollow shaft 227 of the low speed agitator, and is, as shown, directly driven by the motor 28. Gearing 70 connects the shaft 227 with the operating motor 19. In operation, the liquid entering through inlet 51 and the reagent entering through pipe 112 are given a turbulent horizontal swirl, succeeded by a slow motion horizontal rotatory movement produced by inclined blades as shown in Figs. 2 or 3, causing accumulation of the solids into flocs. After passing the slow speed agitator the liquid encounters vanes 236, which break up the rotatory movement. The liquid carrying flocculated sludge passes out through outlet pipe 52 into the settling tank 54, comprising, as shown, cylinder 55 into which the liquid and sludge is delivered by pipe 52. Sludge settled from the liquid is drawn off through a valved outlet distributor 56. The clarified liquid leaves the settling tank near the top through pipe 57.

The unit as described, with a continuous vertical flow of turbid water, effects flocculation of the finely divided precipitates, and delivers a sludge-carrying liquid that is readily clarified by settling. If an exceptionally pure liquid is desired the settled liquid may be further purified by filtration.

I claim:

1. Water treating apparatus for continuous flocculation comprising a settling chamber, a cylindrical upright member, liquid inlet and outlet means at opposite ends of said member directing a vertical flow therethrough of liquid carrying impurities to be flocculated, the outlet means communicating with the settling chamber, means for adding a reagent to the liquid entering through said inlet means, high speed agitator means adjacent the inlet end of the member for imparting speedy horizontal rotary motion to the flowing liquid with agitation and homogenization thereof, relatively slow motion horizontal rotary agitator means in a succeeding relation to said high speed means, two vertical shafts for driving said agitator means and means for respectively rotating said shafts at different speeds and mounted above said member.

2. Flocculating apparatus comprising a settling tank, an upright hollow member disposed within the settling tank and open at its lower end, means for introducing liquid to be treated and chemical into said member near its upper end, high speed agitating means located eccentrically in the upper portion of said member, a substantially vertical drive shaft for said high speed agitating means, low speed agitating means located in the lower portion of said member, a vertical drive shaft for said low speed agitating means, means for rotating both said shafts, and outlet means for withdrawing settled liquid from the upper portion of the settling tank.

3. Flocculating apparatus comprising a flocculating chamber, means for introducing liquid to be treated and chemical into said chamber near its bottom, high speed agitating means located in the lower portion of said chamber, a vertical shaft for said high speed agitating means, low speed agitating means located in the upper portion of said chamber, a vertical shaft for said low speed agitating means, means for rotating both said shafts, a settling tank, a passage for conducting liquid from the upper portion of the flocculating chamber to the lower portion of the settling tank, and outlet means for withdrawing settled liquid from the settling tank.

4. In the apparatus of claim 1, baffle means arranged between the high speed agitator means and the low speed agitator means.

5. Flocculating apparatus comprising a settling tank, an upright cylindrical member disposed in the settling tank and through which liquid to be purified flows vertically downward, a high speed agitator depending from the top of the cylindrical member giving the entering liquid a swirling horizontal motion in its downward flow, a low speed agitator also dependent from the cylinder top and having vertical blades horizontally rotated giving the swirling liquid passing from the high speed agitator a slow horizontal rotatory motion in its downward flow, means for rotating the high speed and low speed agitators, the liquid passing from the low speed agitator into the settling tank, for separation of flocculated sludge.

6. Apparatus according to claim 5, wherein the cylindrical member below the slow motion agitator is provided with stationary horizontal vanes straightening the vertical flow of the liquid.

7. Apparatus according to claim 5, the low speed agitator comprising cross members supported at different levels, and the vertical blades being attached to said cross members at an oblique angle to the cross members.

8. Apparatus according to claim 1, the slow motion agitator means comprising cross members supported at different levels on the vertical shaft of the slow motion agitator means, vertical blades attached to the cross members on one side of the center at an oblique angle to the cross members, and other vertical blades attached to said cross members on the other side of the center at an oblique angle inclined in the opposite direction to the first mentioned angle.

SAMUEL B. APPLEBAUM.